(12) United States Patent
Degen et al.

(10) Patent No.: US 10,048,478 B2
(45) Date of Patent: Aug. 14, 2018

(54) OPTICAL TRANSMISSION SYSTEM FOR CORRECTING IMAGE ERRORS AND MICROSCOPE WITH SUCH A TRANSMISSION SYSTEM

(71) Applicant: Carl Zeiss Microscopy GmbH, Jena (DE)

(72) Inventors: Artur Degen, Jena (DE); Michael Gölles, Jena (DE); Jörg Siebenmorgen, Jena (DE); Helmut Lippert, Jena (DE); Thomas Kalkbrenner, Jena (DE); Ingo Kleppe, Jena (DE); Matthias Wald, Jena (DE); Lars-Christian Wittig, Jena (DE); Wolfgang Singer, Aalen (DE); Ralf Wolleschensky, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 193 days.

(21) Appl. No.: 15/036,582

(22) PCT Filed: Nov. 13, 2014

(86) PCT No.: PCT/EP2014/074488
§ 371 (c)(1),
(2) Date: May 13, 2016

(87) PCT Pub. No.: WO2015/071362
PCT Pub. Date: May 21, 2015

(65) Prior Publication Data
US 2016/0291303 A1    Oct. 6, 2016

(30) Foreign Application Priority Data
Nov. 15, 2013   (DE) .................. 10 2013 112 600

(51) Int. Cl.
*G02B 21/06* (2006.01)
*G02B 21/00* (2006.01)
(Continued)

(52) U.S. Cl.
CPC ........... *G02B 21/0032* (2013.01); *G02B 3/04* (2013.01); *G02B 21/0052* (2013.01);
(Continued)

(58) Field of Classification Search
CPC .. G02B 21/00; G02B 21/0004; G02B 21/002; G02B 21/0032; G02B 21/0052;
(Continued)

(56) References Cited

U.S. PATENT DOCUMENTS 4,412,723 A   11/1983  Shafer
2004/0240046 A1*  12/2004  Tischer ............... G02B 21/02
359/361
(Continued)

FOREIGN PATENT DOCUMENTS

DE         102 57 423        6/2004
DE     10 2013 105 586.9    12/2014
(Continued)

OTHER PUBLICATIONS

Notification of Transmittal of Translation of the International Preliminary Report on Patentability for Application No. PCT/EP2014/074488 dated May 17, 2016.
(Continued)

*Primary Examiner* — Arnel C Lavarias
(74) *Attorney, Agent, or Firm* — Haug Partners LLP

(57) ABSTRACT

An optical transmission system configured to image a selected region of a sample arranged in a first medium in an object plane on or in a sample carrier, which includes plane-parallel plate, from the object plane into an intermediate image plane in a second medium. The plane-parallel
(Continued)

plate is located between the optical transmission system and the sample during the imaging. The object plane and the intermediate image plane form an angle between 0° and 90° with an optical axis of the transmission system. The optical transmission system is positioned relative to region of the sample such that the sample is located within the focal length of the lens of the optical transmission system closest to the sample. The intermediate image plane and the object plane are located on the same side of the optical transmission system, and the intermediate image is a virtual image.

22 Claims, 3 Drawing Sheets

(51) Int. Cl.
    *G02B 27/00*     (2006.01)
    *G02B 21/02*     (2006.01)
    *G02B 21/36*     (2006.01)
    *G02B 3/04*     (2006.01)
    *G02B 21/24*     (2006.01)
    *G02B 21/33*     (2006.01)
    *G02B 21/34*     (2006.01)

(52) U.S. Cl.
    CPC ......... *G02B 21/0076* (2013.01); *G02B 21/02* (2013.01); *G02B 21/248* (2013.01); *G02B 21/33* (2013.01); *G02B 21/34* (2013.01); *G02B 21/367* (2013.01); *G02B 27/0025* (2013.01)

(58) Field of Classification Search
    CPC .. G02B 21/006; G02B 21/0076; G02B 21/02; G02B 21/06; G02B 21/36; G02B 21/361
    USPC ................ 359/362, 363, 368, 369, 385, 433
    See application file for complete search history.

(56) References Cited

U.S. PATENT DOCUMENTS

2006/0028737 A1     2/2006   Sparrold
2011/0261446 A1*   10/2011   Dunsby .............. G02B 21/0076
                                                                                   359/380

FOREIGN PATENT DOCUMENTS

| DE | 10 2013 107 297.6 | 1/2015 |
| --- | --- | --- |
| EP | 2 587 295 | 5/2013 |
| WO | WO 2004/053558 | 6/2004 |
| WO | WO 2012/110488 | 8/2012 |
| WO | WO 2012/122027 | 9/2012 |

OTHER PUBLICATIONS

J. Huisken et al. "Selective Plane Illumination Microscopy Techniques in Developmental Biology", published in 2009 in the journal *Development*, 136, pp. 1963-1975.

International Search Report for Application No. PCT/EP2014/0744488 dated Feb. 4, 2015.

Turaga et al.,"Aberrations and their correction in light-sheet microscopy: a low-dimensional parametrization"; Biomedical Optics Express; vol. 4, No. 9; Sep. 2013 XP055165538.

* cited by examiner

OPTICAL TRANSMISSION SYSTEM FOR CORRECTING IMAGE ERRORS AND MICROSCOPE WITH SUCH A TRANSMISSION SYSTEM

The present application claims priority from PCT Patent Application No. PCT/EP2014/074488 filed on Nov. 13, 2014, which claims priority from German Patent Application No. DE 10 2013 112 600.6 filed on Nov. 15, 2013, the disclosures of which are incorporated herein by reference in their entirety.

FIELD OF THE INVENTION

It is noted that citation or identification of any document in this application is not an admission that such document is available as prior art to the present invention.

The invention is directed to an optical transmission system having at least one lens, which optical transmission system is configured to image a selected region of a sample which is arranged in a first medium in an object plane on or in a sample carrier, which is formed at least partially as plane-parallel plate, from the object plane into an intermediate image plane in a second medium. During the imaging, the plane-parallel plate is located between the optical transmission system and the region of the sample, the object plane and the intermediate image plane form an angle between 0° and 90° with an optical axis of the transmission system, and the angle limiting the interval can also be adjusted. The imaging through the optical transmission system can optionally be carried out in an object-preserving manner, which means that the transmission system in interacting with the media in a predetermined volume region realizes imaging which is true to scale with respect to depth as well as in lateral dimension. The scale of the imaging is given by the ratio of the refractive index of the two media relative to one another, i.e., the magnification is $M=n_1/n_2$, where $n_1$ is the refractive index of the first medium and $n_2$ is the refractive index of the second medium.

Various microscope methods are known from the art in which a sample located on a sample carrier or in a covered sample vessel is observed in such a way that the light does not pass perpendicularly through the sample carrier or the cover of the sample vessel which, as a rule, have the properties of a plane-parallel plate in this region through which the light passes, but rather passes through obliquely—the object plane, i.e., the focal plane of the objective used for observation, forms an angle not equal to zero with the plane in which the large areas of the plane-parallel plate are located. This leads to inaccuracies in imaging, and even at low numerical apertures such as NA=0.3 in water, extreme imaging errors come about such as spherical aberrations and coma, for example. Satisfactory imaging can then no longer be achieved at the required high resolutions by standard objectives alone.

A method in which aberrations of the type mentioned above caused by the oblique passage of light occur for certain structures is that of light sheet microscopy. Light sheet microscopes are used particularly for examining biological samples. The illumination of the sample is carried out with a light sheet, the plane of which intersects the optical axis of detection at an angle not equal to zero. The objectives are directed onto the sample in each instance from above or below at an angle of 45° to the normals of the large areas of the plane-parallel plate. A construction of this kind is described, for example, in WO 2012/110488 A2 and WO2012/122027 A2. The light sheet typically forms a right angle with the detection direction which generally corresponds to the optical axis of the detection objective. Spatial recordings of even thick samples can be made relatively quickly with this technique, also referred to as SPIM (selective plane illumination microscopy). A graphic, spatially extensive representation of the sample is made possible based on optical sections combined with a relative movement in a direction perpendicular to the section plane.

The SPIM technique is preferably used in fluorescence microscopy, in which connection it is also referred to as LSFM (light sheet fluorescence microscopy). The LSFM technique has a number of advantages over other established methods such as confocal laser scanning microscopy or two-photon microscopy. Since widefield detection can be carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which, among other things, reduces the risk of photobleaching of a sample because the sample is only illuminated by a thin light sheet at an angle not equal to zero.

Both a static light sheet, which is generated, for example, by means of cylindrical lenses, or a quasistatic light sheet can be used. This quasistatic light sheet can be generated through fast scanning of the sample with a light beam. The light sheet-type illumination is brought about in that the light beam undergoes a very fast relative movement with respect to the sample to be observed and is thus strung together over and over in a temporally consecutive manner. The integration time of the camera on whose sensor the sample is ultimately imaged is selected such that the scanning is concluded within the integration time. Instead of a camera with a two-dimensional array, a line sensor combined with a renewed scanning (rescan) can also be used in the detection optics. Further, confocal detection can also be carried out.

The SPIM technique has been described numerous times in the literature, for example, in DE102 57 423 A1 and in WO2004/053558 A1 which is based on the latter, and in the survey article "Selective Plane Illumination Microscopy Techniques in Developmental Biology" by J. Huisken et al. published in 2009 in the journal *Development*, vol. 136, p. 1963.

One of the chief applications of light sheet microscopy is for imaging intermediate-sized organisms having a size of some hundreds of micrometers to a few millimeters. Generally, these organisms are embedded in an agarose gel which is located in turn in a glass capillary. The glass capillary is inserted from above or below into a sample chamber filled with water, and the sample is pushed some distance out of the capillary. The sample in the agarose is then illuminated by a light sheet, and the fluorescence is imaged on the detector of a camera by a detection objective oriented perpendicular to the light sheet and, therefore, also perpendicular to the light sheet optics.

This method of light sheet microscopy has three great disadvantages. For one, the samples to be examined are relatively large, since they derive from developmental biology. Further, as a result of the sample preparation and the dimensions of the sample chamber, the light sheet is relatively thick and the attainable axial resolution is accordingly limited. Finally, preparation of samples is also uneconomical and is not compatible with standardized sample preparations or standardized sample holders commonly used in fluorescence microscopy for analyzing individual cells.

In order to circumvent these limitations at least partially, a SPIM construction was recently implemented in which the illumination objective and the detection objective are perpendicular to one another and are directed onto the sample from above at an angle of 45° in each instance with respect to the normals of a reference surface. A construction of this kind is described, for example, in WO 2012/110488 A2 and WO2012/112027 A2.

In constructions such as these, the sample is located, for example, on the bottom of a petri dish which is filled with water. The illumination objective and detection objective are immersed in the liquid, and the water also takes on the function of an immersion liquid. This approach offers the advantage of higher resolution in axial direction, since a thinner light sheet can be generated. Smaller samples can then also be examined owing to the higher resolution. Sample preparation is also made significantly easier. Nevertheless, the sample preparation and sample holders still do not correspond to the standard currently applicable in fluorescence microscopy with individual cells: for example, the petri dish must be relatively large so that the two objectives can be immersed in the dish without hitting the edge of the dish. Microtiter plates—also known as multi-well plates—which are standard in many branches of biology and are also used precisely in fluorescence microscopy analysis of individual cells cannot be used with the above-described method because the objectives cannot be immersed in the very small wells arranged in grid shape on the plate. A further disadvantage consists in that it is not readily possible with this construction to analyze a large number of samples in a short period of time (high-throughput screening) because the objectives must be cleaned when changing samples in order to avoid contaminating the different samples.

One way to overcome these disadvantages is to maintain the configuration of angles of 45° on one side, but to direct the two objectives onto the sample not from above, but rather in the manner of an inverted microscope from below, where illumination and detection then take place through the transparent bottom of the sample vessel or, generally, sample carrier. This transparent vessel bottom together with the air layer located between the bottom and the objectives then forms the separating layer system. Detection can then continue from above in an equivalent manner provided the sample vessel is covered by a transparent cover. In this way, all typical sample vessels, for example, microtiter plates, petri dishes and object carriers, can be used. In particular, a contamination of the samples can also be prevented in this way in case of high-throughput analysis.

However, owing to the fact that the observation light or detection light must pass through the sample carrier or the coverslip thereof, extreme imaging aberrations such as spherical aberration, coma and astigmatism occur even at low numerical apertures such as NA=0.3 in water because of this oblique passage. Accordingly, correct imaging is no longer possible when using standardized objectives.

Various approaches have been described in the art for solving the problem of aberrations under oblique passage of light. The light sheet microscope is only one of a number of microscope arrangements in which the oblique passage of light plays a part. For example, oblique passage of light can also be significant in material-microscopy applications. It is suggested in German Patent Application 10 2013 107 297.6 to integrate correction means in the form of correction lenses or lens groups in the respective microscope objective. Cylindrical lenses, lenses which are tilted relative to the optical axis or lenses which are not arranged axially are examples of the correction lenses suggested therein. The correction lenses also comprise elements with aspherical surfaces or free-form surfaces. Further, the materials used for the object carrier have approximately the refractive index of the immersion medium. Adaptive optical elements for manipulating the phase fronts of the illumination light and/or detection light are suggested for eliminating further aberrations. As a result of this, however, the objectives must be re-designed at least in part. Therefore, this is a quite expensive solution.

A construction comprising a transmission system in which two imaging systems are coupled to one another in a mirror-symmetrical manner is described in US2011/0261446 A1. The two imaging systems are arranged mirror-symmetrically with respect to the optical elements thereof, where the mirror plane corresponds to the original image plane of the first imaging system, in which the illuminated region of the sample obliquely intersects the image plane in the image during oblique passage of light. The magnification of the transmission system is selected so as to correspond to the ratio of the refractive index of a first medium in which the sample is located to the refractive index of a second medium in which the intermediate image is located. In this way, the object plane can be displayed without distortion with respect to the intermediate image plane and so as to be only insignificantly magnified. To obtain a magnified view of the sample, a microscope objective is positioned in such a way that its optical axis is perpendicular to the intermediate image plane, and the microscope objective is focused on the intermediate plane. In this way, the sample can be imaged on a detector without distortion, i.e., so as to be free from aberrations with a magnification depending on the microscope.

This procedure of using a transmission system is further improved in German Patent Application 10 2013 107 297.6 through the suggested use of catadioptric lenses. In this way, the quantity of lenses used for the transmission system can be reduced and the constructional unit can be more compact. It is suggested that a second medium be used in addition, the intermediate image plane being located therein, and the second medium likewise contacts the transmission system so that it acts as immersion medium. However, this solution also uses a large number of lenses and, because of the size of the transmission system, it is difficult to integrate in existing constructions. In principle, however, existing objectives can continue to be used when a transmission system of this type is used.

On the other hand, it is possible to correct imaging errors with very few lenses as is described in U.S. Pat. No. 4,412,723. Disclosed is an individual lens which is sufficient to correct imaging errors which occur when the object plane does not lie parallel to a large area of a beamsplitter, i.e., the light passes through this beamsplitter at an angle not equal to zero.

When the beamsplitter which is configured as a plane-parallel plate is regarded as sample carrier, the individual correction lens is arranged between the region of the sample to be imaged, i.e., the object plane or focal plane, and the sample carrier or coverslip. Further, in the solution proposed in U.S. Pat. No. 4,412,723, the sample, correction lens and sample carrier are located in the medium of air. Therefore, for microscopy with samples of very small sizes, for example, individual cells, but particularly in high-throughput analysis of microscopic samples, the use of an individual correction lens of this type as proposed in U.S. Pat. No. 4,412,723 is ruled out.

SUMMARY OF THE INVENTION

Therefore, it is the object of the invention to develop a transmission system which makes it possible to use existing standard microscope objectives and to keep the quantity of optical elements in the transmission system as small as possible at the same time and accordingly to realize a simple construction, wherein aberrations that occur as a result of the oblique position of the focal plane or object plane relative to a sample carrier or the coverslip of a sample vessel so that the light passes through obliquely are corrected. On the other hand, it should also allow microscopy with very small samples so that the transmission system should also be suitable for use in high-throughput analysis of samples.

This object is met for an optical transmission system of the type mentioned in the introductory part in that the optical transmission system is positioned relative to the selected region of the sample such that the region of the sample is located within the focal length of the lens of the optical transmission system closest to the sample and the intermediate image plane and the object plane are located on the same side of the optical transmission system. Accordingly, the transmission system is integrated or arranged in the microscope in such a way that the sample is located inside the focal length during microscopic analysis. The intermediate image is a virtual image as is implied by the fact that the intermediate image plane is on the same side as the object plane.

In contrast to transmission systems known heretofore in which a real, accessible image is generated, a virtual, inaccessible image is formed when using the optical transmission system according to the invention. Therefore, the optical transmission system is also referred to in the following by the tag "virtual relay". In this case, also, not only can the object plane be optionally imaged true to scale, but a volume region of a certain size can also be imaged true to scale as in the arrangement described in German Patent Application 10 2013 105 586.9.

The second medium in which the intermediate image plane is located can be air, for example. The virtual volume image can then be observed with any objectives which have been corrected for the second medium, i.e., particularly also dry objectives. For the detection objective, the virtual image appears—with object-preserving imaging—as volume object and the focusing on certain planes of a volume object of this kind takes place as usual by changing the working distance of the microscope objective or through internal focusing.

The spherical aberrations which are caused by the plane-parallel plate of the sample carrier or coverslip of the sample vessel are corrected simultaneously by the virtual relay when the required focal plane forms an angle not equal to zero with the normals of the large areas of this plate. Higher spherical aberrations can also be corrected with this optical transmission system provided it is appropriately designed.

A great advantage in generating a virtual intermediate image with the suggested optical transmission system consists in that, surprisingly, only a few lenses need be used for this purpose. Optimal results with respect to the quantity of lenses on the one hand and the quality of corrections on the other hand are achieved already with two rotationally symmetrical lenses. The surfaces of these lenses can all be spherical, but it is preferable to provide at least one of the lenses with an aspherically shaped surface, which makes it possible in particular to allow corrections in a wide angular range of virtually 90° to the normals of the large areas of the plane-parallel plate with sufficient quality. But optimal results are achieved when the corrected region is limited to an opening angle of about 82°. When using immersion media, high numerical apertures can be realized in this way, for example, NA=1.32 for water or physiologic saline solutions and NA=1.52 for oil. When used in the microscope, the optical transmission system is positioned in such a way that its optical axis lies parallel to the two normals of the large areas of the plane-parallel plate.

In a preferred embodiment, the optical transmission system is configured in such a way that it images the region of the sample with a magnification $M=n_1/n_2\cdot\xi$. The refractive index of the first medium is denoted by $n_1$ and the refractive index of the second medium is $n_2$. The first medium is the medium in which the sample is located, for example, water or a nutrient solution, e.g., a physiologic saline solution. It is also possible in principle to use air as first medium. The second medium is also freely selectable in principle and can be taken into account in the configuration of a specific virtual relay. However, it is advantageous to use air as second medium because standard microscope objectives for observation in air, known as dry objectives, can then be used. This affords considerable cost advantages because existing microscopes can then be retrofitted relatively inexpensively, which is easily accomplished as a rule because the virtual relay is constructed very compactly and can easily be integrated in the microscope construction in the manner of an adapter.

The magnification can be further varied through the parameter $\xi$. This is a factor that is freely selectable in principle and is taken into account in the optical design, the construction of the virtual relay. The factor preferably lies in a range between 0.5 and 2, but diverging values are also possible. However, $\xi=1$ is particularly advantageous because the sine condition—the condition for a coma-free imaging of the object plane in the intermediate image plane—and the Herschel condition—the condition for undistorted depth imaging—are met simultaneously so that the lateral magnification and the depth magnification are identical and on-axis imaging in small volume regions is free of coma and spherical aberrations.

Since the intermediate image generated by the virtual relay within a certain volume shows all of the characteristics of the volume object within the corrected numerical aperture of the optical transmission system—also without distortion when $\xi=1$—the volume image can, in principle, be observed at any angle with a microscope objective provided the numerical aperture of the microscope objective is less than or equal to the (corrected) numerical aperture of the optical transmission system, which numerical aperture depends on the selection of an immersion medium between plane-parallel plate and front lens of the transmission system; there can also be an immersion medium between the lenses of the transmission system. For this reason, it is advantageous to select the largest possible opening angle of more than 75° or the highest possible numerical aperture for the optical transmission system, for example, a value NA of 1.32 when the immersion medium is water, corresponding to an opening angle of about 83°.

The optical transmission system can be used in principle with any microscope bodies and employed meaningfully wherever the focal plane of the respective microscope objective, i.e., the object plane, is not parallel to the interfaces of the plane-parallel plate as part of a sample carrier or sample vessel because of the method of analysis or the construction.

The sample is arranged in a first medium in an object plane on or in a sample carrier which is formed at least partially as a plane-parallel plate. For example, if the sample carrier is a sample vessel which has side walls and can be filled with liquid, the plane-parallel plate can also be formed by a cover of the sample vessel. The object plane lies obliquely with respect to this plane-parallel plate, which means that the light—with respect to the optical axis of the microscope objective perpendicular to the object plane—passes obliquely through this plane-parallel plate. The optical transmission system described above is then part of the microscope which, moreover, comprises at least one microscope objective as part of a microscope imaging and/or illuminating system. Depending on the purpose, the microscope objective is designed as detection objective for imaging from the intermediate image plane in the second medium into an image plane which can be formed, for example, by the area detector of a camera or as illumination objective when, for example, illumination light in the form of a light sheet is imaged into the intermediate image plane and from the latter through the transmission system into the object plane. The optical axis of the at least one microscope objective extends perpendicular to the intermediate image plane on which the at least one microscope objective is focused. The sample region from which imaging is to take place is located inside the focal length of the lens of the optical transmission system closest to the sample, and the intermediate image is a virtual image, the intermediate image plane and the object plane being on the same side of the optical transmission system.

It is advisable when the numerical aperture $NA_M$ of the at least one microscope objective is no higher than the numerical aperture $NA_O$ of the optical transmission system because then a corrected imaging can take place in a maximum angular range around the normals of the plane-parallel plate or of the optical axis of the optical transmission system. The numerical aperture $N_M$ of the microscope objective can also be asymmetrical in order, for example, to take into account a position that is tilted relative to the optical axis of the transmission system. The numerical aperture can be smaller in meridional direction, i.e., in the direction of tilting, than in the sagittal direction, i.e., perpendicular to the direction of tilting, so that the highest possible tilting angle can be realized on the one hand and the highest possible opening angle can be implemented on the other hand.

In a preferred configuration, the region between the lens of the optical transmission system closest to the sample and the plane-parallel plate is filled with a third medium which serves as immersion medium for the optical transmission system. This third medium preferably has optical refraction properties similar to or identical to the first medium. The two media can also be identical, for example, water. In this respect, it should be ensured that the refractive index of the third medium is not lower than that of the first medium in order to avoid the occurrence of total reflection, which would sharply curtail the accessible angular range. The use of an immersion medium allows a more compact configuration of the optical transmission system and greater opening angles or higher numerical apertures. It is advantageous to use a third medium having a refractive index which is also similar to that of the material of the plane-parallel plate in order to maximize the usable angular range. In principle, however, the choice of the third medium is also optional in this case. The third medium can also be air or another gas. When air is used as third medium, the opening angle is generally smaller because otherwise at greater incident angles, i.e., at greater opening angles, total reflection occurs owing to the lower refractive index of air compared to customary immersion media.

The use of water as third medium requires that the optical transmission system be connected to the sample carrier in the region of the plane-parallel plate so tightly that no water can escape from the region between the sample carrier and the front lens of the virtual relay. Accordingly, it can be technically burdensome to arrange the virtual relay in the microscope. Therefore, a solid or amorphous medium, for example, an amorphous fluoropolymer such as that marketed by Bellex Int. Corp under the name CYTOP® is advantageously used as third medium. Due to its consistency, this material need not be stored separately in a vessel, which is a great advantage for coupling the optical transmission system. Glycerol and glycerol compounds can also be used as first medium and as third medium. With these and other suitable clearing liquids, as they are called, samples to be analyzed can be made partially transparent, which is advantageous in analysis.

In a particularly advisable configuration, the microscope comprises a holder for receiving the optical transmission system and for fixing the latter relative to a stand, relative to a sample stage and/or to the sample carrier. For focusing, the microscope objective then advisably has preferred means for internal focusing and/or is displaceable along its optical axis relative to the optical transmission system.

Accordingly, the optical transmission system is arranged in a definitively predetermined position in the microscope so as always to be at the same distance from the sample carrier. The holder is conceived in such a way that the virtual relay can be easily exchanged because a virtual relay of this kind is specifically adapted to the material of the plane-parallel plate but also to the first medium, second medium and particularly the third medium that is used. Glass or plastic, for example, can be used as material for the plane-parallel plate. Common thicknesses are between 0.17 mm and 0.5 mm. Since the optical transmission system can be constructed in a very compact manner and can make do with a maximum of two lenses, it is also possible to design the holder in the manner of a revolving drum with receptacles for a plurality of optical transmission systems which can then be inserted into the beam path depending on the sample carrier and/or media that are used.

When air is used as second medium, the microscope objective is preferably configured as a dry objective; in this case, existing standard objectives could continue to be used.

In a preferred embodiment, the angle that is formed by the optical axis of the at least one microscope objective and the optical axis of the optical transmission system is freely adjustable. This also makes it possible to use a plurality of objectives simultaneously, e.g., for observing from two directions simultaneously and illuminating the sample from a third direction which can be located between these two detection directions, for example. In order to make it easier to observe the sample from different directions when only one objective is available for observing, it is advantageous to provide means allowing the at least one microscope objective is to be rotatable with respect to the optical transmission system relative to the optical axis thereof when the optical axis of the at least one microscope objective forms an angle not equal to zero with the optical axis of the optical transmission system. Since the virtual relay is constructed in a rotationally symmetrical manner, the sample can be observed from any direction and angle, and the spherical aberrations arising as a result of the oblique passage of light are always corrected. The rotation of the microscope objective relative to the optical axis of the transmission system can take place in such a way that the microscope objective is rotatable around the optical axis of the virtual relay, for example, through corresponding rotary devices at the microscope body which can preferably be controlled and automatically moved. Optionally, the adjusted angle of the microscope objective relative to the optical axis can also be varied. Alternatively, it is also conceivable to rotate the sample, but this is usually more complicated because it would also be coupled with a lateral movement in this case.

In a particularly preferred configuration, the microscope is configured as a light sheet microscope. It then comprises a first microscope objective configured as an illumination objective for illuminating the sample with a light sheet and a second microscope objective configured as a detection objective for detecting light which is emitted from the region of the sample. The optical axes of the illumination objective and detection objective form an angle not equal to zero, preferably an angle of 90°. The use of the optical transmission system offers great advantages particularly in light sheet microscopy because the construction of the microscope can be made even more compact through this arrangement, and the advantageous arrangement of the objectives at an angle of 45° in each instance relative to the normals of the plane-parallel plate can be maintained. Of course, other angles are also possible and are advantageous particularly at different numerical apertures of the objectives—the objective with the smaller numerical aperture can then be arranged at a greater angle to the normals of the plane-parallel plate. The angle formed by the principal optical axes of the two objectives should be approximately 90°. The optical axis of the illumination objective, of the optical transmission system and of the detection objective advisably lie in a plane, although this is not mandatory; observation at other angles is also possible. In order to acquire recordings from different directions which can be compiled to form a total image, the two objectives are then preferably rotatable simultaneously around the optical axis of the virtual relay, but the two objectives are fixed in position relative to one another.

Alternatively, the optical axis of the detection objective can also be fixed relative to the optical axis of the optical transmission system, and only the illumination objective is rotatable with respect to the optical axis of the detection objective relative thereto. This alternative can be useful, for example, when the optical axis of the detection objective coincides with the optical axis of the optical transmission system.

For generating multi-view recordings in which the sample is alternately illuminated from different directions and detected in different directions, it is advantageous when the optical axis of the illumination objective defines a first plane with the optical axis of the optical transmission system, and the optical axis of the detection objective defines a second plane with the optical axis of the transmission system, which second plane intersects the first plane at a predetermined angle. The angle can be 120°, for example, so that a third microscope objective can easily be added, which microscope objective is then likewise arranged at an angle of 120° relative to the two adjacent objectives so that the three microscope objectives form a tripod. The optical axes of the three microscope objectives are then preferably perpendicular to one another in pairs, and the microscope is provided with a control which makes it possible to operate each of the three microscope objectives either as illumination objective or as detection objective, which can be achieved through slight constructional alterations, particularly when a quasi-static light sheet is used; no cylindrical lenses, etc. arranged in the beam path need be used for this purpose. In an alternating manner, one objective is operated as illumination objective and the other two microscope objectives are operated as detection objectives. The control can, of course, also be used for a system with only two microscope objectives. Advantageously, all of the objectives which are switched between are identically designed in order to obtain comparable illumination conditions and imaging conditions in each instance.

In a further advantageous configuration, the microscope comprises an objective turret at which the illumination objective and the detection objective are arranged—for example, screwed in—and at which a further microscope objective is arranged. In a first position of the objective turret in which illumination objective and detection objective are swiveled into the beam path, the microscope can be operated as a light sheet microscope, and in a second position in which only the further microscope objective is swiveled into the beam path the microscope can be operated in another operating mode. This makes it possible to combine different operating modes and observation modes.

For example, the optical axis of the further microscope objective can coincide with the optical axis of the optical transmission system when the further microscope objective is swiveled into the beam path. When the further microscope objective is designed as widefield objective with a low magnification—preferably 10×— in the range of up to 20, this further microscope objective can be used, for example, to capture an overview image of a larger region for orienting and fixing the sample region to be analyzed. Alternatively, the further microscope objective can also be designed as an objective with a high opening angle of more than 60° and a correspondingly high numerical aperture, for example, 1.2 for water as immersion medium. With an objective of this type, an image can then be recorded in a laser scanning mode. Other objectives can also be employed in this location for use with the SD (Spinning Disk), TIRF (Total Internal Reflection Fluorescence) or SIM (structured Illumination Microscopy) methods. The further microscope objective can also form an angle not equal to zero with the optical axis of the virtual relay. Since the correction of the aberrations of the oblique passage takes place exclusively in the virtual relay, no further correction mechanisms need be provided in the objective. This leads to considerable cost savings.

It will be appreciated that the features mentioned above and those to be described hereinafter can be used not only in the indicated combinations but also in other combinations or individually without departing from the scope of the present invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
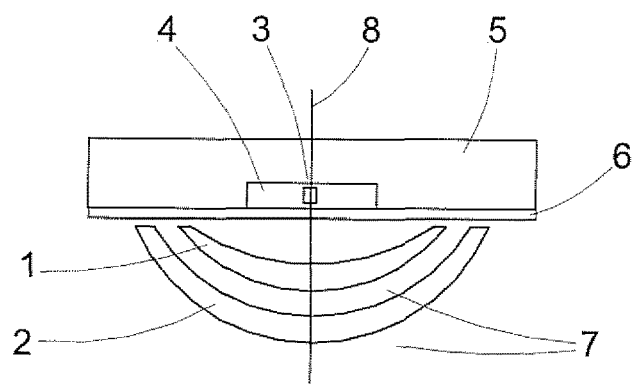
FIG. 1 the basic construction of an optical transmission system.

First, FIG. 1 shows the basic construction of an optical transmission system. The optical transmission system comprises at least one lens. Two lenses are used in the present example, a first lens 1 configured as front lens and a second lens 2. The optical transmission system images a selected region 3 of a sample 4—which is arranged in a first medium 5 in an object plane on or in a sample carrier which is at least partially formed as plane-parallel plate 6—from the object plane into an intermediate image in an intermediate image plane in a second medium 7. During the imaging, the plane-parallel plate 6 is located between the optical transmission system and region 3 of the sample 4. The object plane and intermediate image plane form an angle between zero and 90° with an optical axis 8 of the transmission system. The optical transmission system is positioned relative to region 3 of the sample 4 such that this region 3 of the sample 4 is located within the focal length of the lens 1 of the optical transmission system closest to the sample. The intermediate image is a virtual image. The intermediate image plane and the object plane are located on the same side of the optical transmission system. Lenses 1 and 2 are both rotationally symmetrical, at least one of the two lenses 1 and 2 being provided with an aspherically shaped surface. Water, for example, can be used as first medium 5 and air can be used as second medium. It is advantageous for a high numerical aperture, but not mandatory, that the first medium 5 also fills the region between the plane-parallel plate 6 and the front lens 1 of the optical transmission system. Alternatively, a third medium can also be used.

Figure 2:
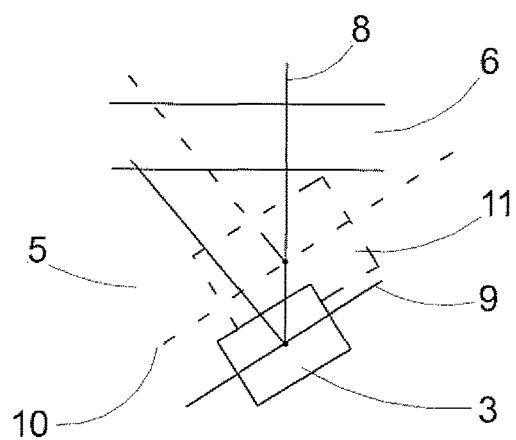
FIG. 2 the aspect ratios in a transmission system of this type.

The imaging behavior of the optical transmission system, also referred to by the tag "virtual relay", is shown in more detail in FIG. 2. Here, region 3 of the sample 4 is shown in an enlarged view. An object plane 9 is defined in this region. The object plane 9 forms an angle not equal to 90° with the optical axis 8 of the optical transmission system. The direction shown perpendicular to the object plane 9 then corresponds, for example, to the direction from which an observation objective, a microscope objective, is directed to the sample. This object plane 9 is then imaged on an intermediate image plane 10 which is likewise located in the area where the sample 4 is arranged; that is, the intermediate image which is formed is a virtual image. The intermediate image is enlarged compared to the original object, which is characterized in this case by the magnified volume image region 11. The magnification of the optical transmission system is adjusted in such a way that it corresponds to the ratio of the refractive index of the first medium to that of the second medium, multiplied by a factor which is freely selectable. If ξ is not equal to 1, the image is distorted either laterally or in depth, i.e., is not imaged true to scale in volume. In the present case, however, ξ is equal to 1 so that imaging takes place in an object-preserving manner, i.e., region 3 of the sample is imaged in the volume region 11 so as to be magnified to scale, specifically over the entire volume region 11. In this case, the magnification is M=1.33 when the first medium is water and the second medium is air. If ξ is not equal to 1, only the object plane is imaged true to scale in the intermediate image plane because either the sine condition or the Herschel condition is no longer met. The selected numerical aperture of the optical transmission system should be as high as possible. For example, it can be 1.32, corresponding to an opening angle of about 83°, when using water immersion medium as third medium between the plane-parallel plate 6 and the front lens of the transmission system. The opening angle should preferably be at least 75°.

With object-preserving imaging, a microscope objective can be focused without further corrections on any intermediate image plane 10 lying in the volume region 11 which is imaged in an object-preserving manner.

Figure 3:
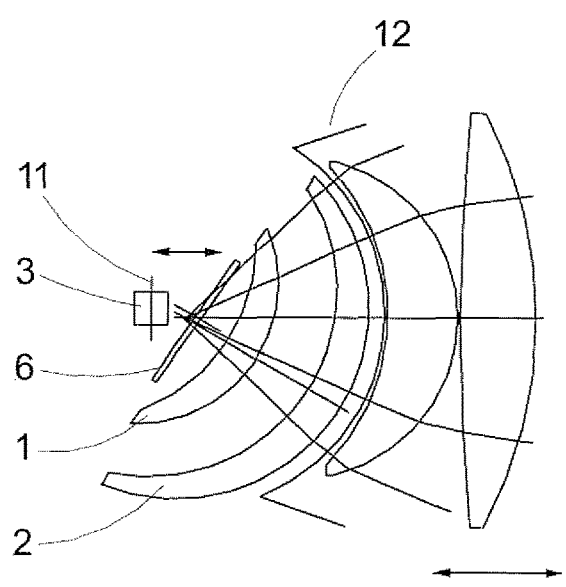
FIG. 3 a transmission system in interaction with a microscope objective.

This is shown by way of example in FIG. 3. In this case, a microscope objective 12 with its first two lenses is shown on the side of the optical transmission system remote of the plane-parallel plate 6. The focusing of the microscope objective on its object plane is carried out in this case by a displacement of the objective along its optical axis, in this case approximately within a range of 67 μm in both directions from a neutral position. As a result of this movement, the object plane of the microscope objective 12 corresponding to the intermediate image plane 10, which can be arranged anywhere in the volume image region 11 with an object-preserving imaging, by about 50 μm in both directions.

Since the virtual relay images into the second medium 7, the virtual intermediate image is likewise formed in this medium, i.e., for example, in air. Under these circumstances, already-existing dry objectives can continue to be used on the microscope side. The optical transmission system is preferably held in a holder, not shown, for receiving same such that it is fixed relative to a stand of the microscope, a sample stage and/or the sample carrier with the plane-parallel plate 6. The microscope objective is displaced for focusing either along its optical axis relative to the optical transmission system or also via means for internal focusing. The angle formed by the optical axis of the at least one microscope objective 12 and the optical axis 8 of the optical transmission system is preferably freely selectable, i.e., the objective of the microscope is adjustable relative to the sample in a large angular range. This adjustment can be carried out at the microscope itself or at the holder of the sample and at the sample itself. Also, the optical axis of the at least one microscope objective 12 can form an angle not equal to zero with the optical axis 8 of the optical transmission system and can be rotatable with respect to the optical transmission system and the optical axis 8 thereof.

Figure 4:
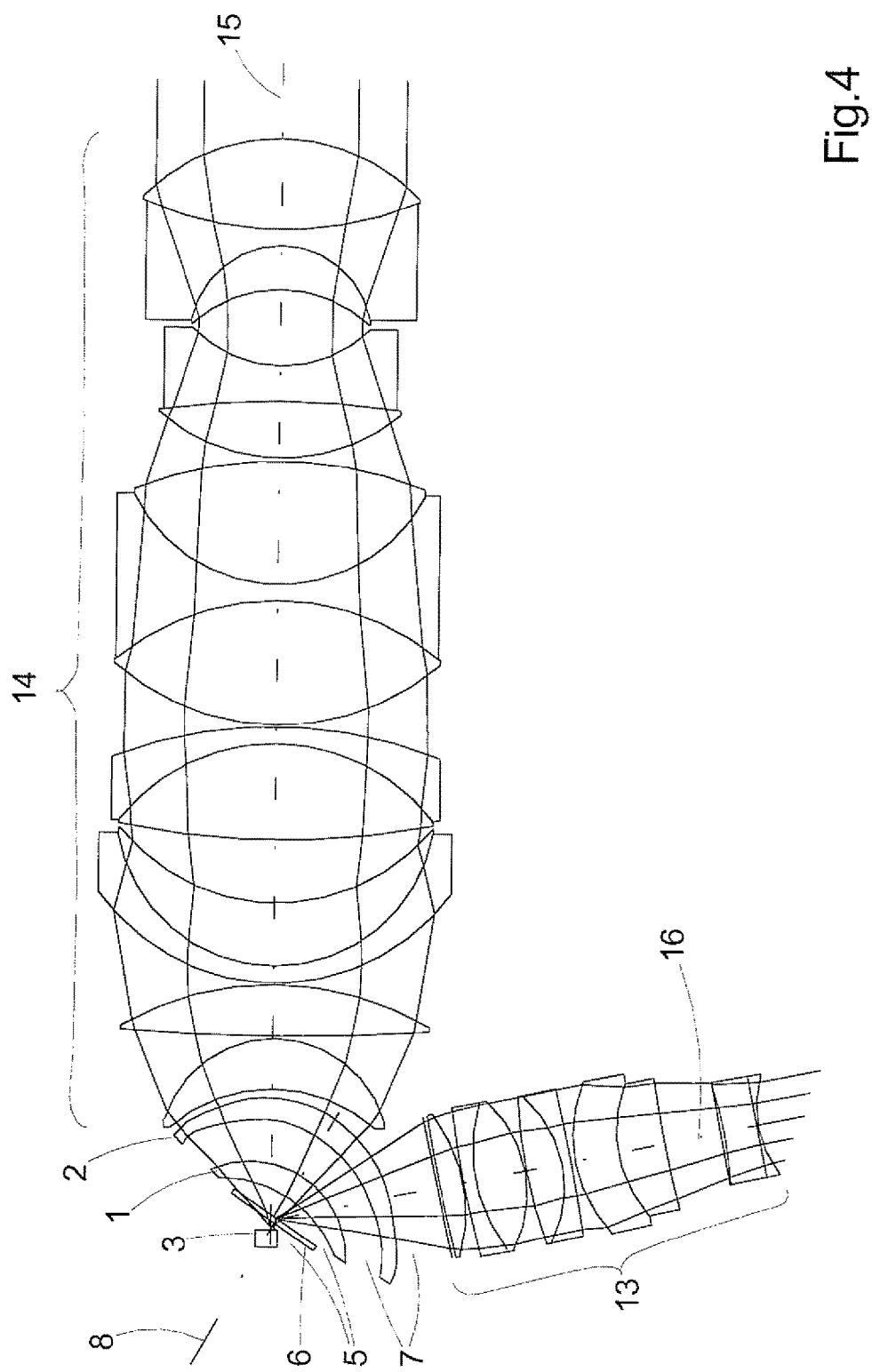
FIG. 4 a transmission system in a light sheet microscope.

In particular, a microscope which uses the above-described optical transmission system can also be configured as a light sheet microscope. This is shown by way of example in FIG. 4. A first microscope objective is configured as illumination objective 13. The illumination objective 13 illuminates the sample 4 with a light sheet. A second microscope objective is designed as detection objective 14. It detects light which is emitted from region 3 of the sample 4. The optical axes of the illumination objective and of the detection objective form an angle of 90°. The angle of the optical axis 15 of the detection objective 14 relative to the optical axis 8 of the optical transmission system is 32° in this case and, correspondingly, the angle of the optical axis 16 of the illumination objective 13 is 58°. In the transmission system shown in FIG. 3 and depicted more exactly in FIG. 5, the virtual image in air as second medium 7 acts such that it is magnified by a factor of 1.33 relative to the object. Water or a physiologic saline solution is used as third medium and as first medium. Glycerol or other clearing liquids can also preferably be used. The numerical aperture of the optical transmission system is 1.32, and that of the detection objective 14 is 1. The illumination objective 13 has an even lower aperture, for example, in the range of 0.3±0.2. The illumination objective 13 and detection objective 14 are designed for special purposes within the framework of light sheet microscopy. However, other configurations are also conceivable in which the two objectives are identically outfitted with an average aperture so that they can be used alternately for multi-view recordings in which the objectives are alternately used as illumination objective and detection objective.

Figure 5:
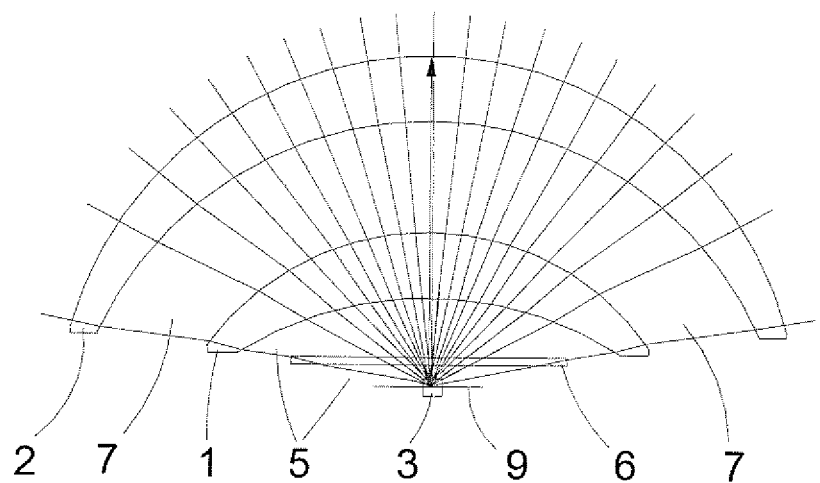
FIG. 5 an embodiment example for an optical transmission system.

The optical transmission system shown in FIG. 5 has the data indicated in

TABLE 1

Data for the virtual relay from FIG. 5

| No. | Radius  | Distance | Medium | $n_d$  | $n_C$  | $n_F$  | $n_g$  |
|-----|---------|----------|--------|--------|--------|--------|--------|
| 1   | 0       | 0.5      | W23    | 1.3360 | 1.3329 | 1.3390 | 1.3417 |
| 2   | 0       | 0.17     | NK5    | 1.5246 | 1.5202 | 1.5291 | 1.5334 |
| 3   | 0       | 2.02     | W23    | 1.3360 | 1.3329 | 1.3390 | 1.3417 |
| 4   | −8.0522 | 1.50     | NK5    | 1.5246 | 1.5202 | 1.5291 | 1.5334 |
| 5   | −5.8050 | 2.52     | Air    | 1      | 1      | 1      | 1      |
| 6   | −8.2009 | 1.50     | NK5    | 1.5246 | 1.5202 | 1.5291 | 1.5334 |
| 7   | −8.3898 | 1        | Air    | 1      | 1      | 1      | 1      |

Crown glass designated by NK5 with a thickness of 0.17 mm is used as material for the plane-parallel plate 6, surface number 2. The data for radius and thickness or distance is given in mm. "W23" stands for a physiologic saline solution (NaCl). The distance between the sample and the outermost lens surface 7 of the optical transmission system is 7.54 mm here. The refractive index $n_d$ relates to wavelength $\lambda_e$=546.07 nm, refractive index $n_C$ relates to wavelength $\lambda_C$=643.84 nm, refractive index $n_F$ relates to wavelength $\lambda_F$=479.99 nm and refractive index $n_g$ relates to wavelength $\lambda_e$=435.83 nm. In Table 1, "1" designates the location of the sample, i.e., the object plane; this is arranged at a distance of 0.5 mm from the coverslip. The region between the plane-parallel plate 6 and the first surface 4 of the front lens 1 closest to the sample is filled with the third medium, in this case also with saline solution W23. Thus in this example the third medium and first medium 5 are identical. The third medium acts as immersion medium for the virtual relay. The distance of the front surface number 4 from the sample carrier in the vertex is accordingly 2.02 mm. The thickness of the front lens 1 of crown glass is 1.50 mm, etc. Also, the second lens is made of crown glass. Air, as second medium 7, is between the two lenses.

Further, the outer surface 5 of the front lens 1 has an aspherical shape. The aspherically shaped surface, in this case a rotationally symmetrical conic asphere, is described by the following relationship:

$$f(h) = \frac{\rho h^2}{1 + \sqrt{1 - (1+K) \cdot (\rho h)^2}} + \sum_{i=2}^{N} c_{2i} h^{2i}$$

where K is the conic constant, i and N are natural numbers, $c_{2i}$ denotes the coefficient of a polynomial in h. The relationship $\rho=1/R$ applies for $\rho$, and R designates the radius of an imaginary conic surface at the vertex of this surface, i.e., the distance of the vertex from the closest focal point. In this respect, both the vertex and the focal points of the conic surface lie on the optical axis, where h designates the distance to the optical axis at which the value of function $f(h)$ is determined, $f$ is the distance of the lens surface from a plane perpendicular to the optical axis at the vertex of the conic surface at distance h from the optical axis. Coefficient $c_{2i}$, conic constant K and radius R are determined by iteration. In the present example, the value of the conic constant K is −0.1806 and the vertex radius is R=−5.8050 mm. Assuming a conventional lens height of about 30 mm, the following coefficients of the polynomial in h to i=3 result: $c_2$=1.3909·10$^{-4}$, $c_4$=3.2862·10$^{-7}$ and $c_6$=−1.5531·10$^{-9}$.

The numerical aperture $NA_M$ of the microscope objective should not be greater than the numerical aperture $NA_O$ of the optical transmission system so that the volume image region 11 can be observed under all possible angles with microscope objective 12. In the example shown in FIG. 5, the beam path is corrected up to an opening angle of 82° as is indicated by the outermost rays. An adapter would then be placed only in the area where the optical transmission system did not correct.

The optical transmission system described above makes it possible to correct a compact component for correcting spherical aberrations during oblique passage of light without having to replace existing objectives. The virtual relay can accordingly supplement existing microscopes, particularly microscopes which are designed for light sheet microscopy but do not correct, or do not sufficiently correct, spherical aberrations.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE CHARACTERS

1 lens
2 lens
3 region
4 sample
5 first medium
6 plane-parallel plate
7 second medium
8 optical axis
9 object plane
10 intermediate image plane
11 volume image plane
12 microscope objective
13 illumination objective
14 detection objective
15 optical axis
16 optical axis

The invention claimed is:

1. An optical transmission system comprising:
   at least one lens;
   wherein the optical transmission system is configured to image a selected region of a sample, when the sample is arranged in a first medium in an object plane on or in a sample carrier that is formed at least partially by a plane-parallel plate located between the optical transmission system and the selected region of the sample, from the object plane into an intermediate image plane in a second medium;
   wherein the optical transmission system is configured to image the selected region of the sample so that each of the object plane and the intermediate image plane forms an angle between 0° and 90° with an optical axis of the transmission system; and
wherein the optical transmission system is configured to be positioned relative to the selected region of the sample, during the imaging of the selected region, such that the selected region of the sample is located within a focal length of the at least one lens of the optical transmission system, and the intermediate image plane and the object plane are located on a same side of the optical transmission system.

2. The optical transmission system according to claim 1, further comprising:
exactly two rotationally symmetrical lenses.

3. The optical transmission system according to claim 1;
wherein the optical system is configured such that it images the selected region of the sample with a magnification $M=n_1/n_2 \cdot \xi$, where:
$n_1$ is a refractive index of the first medium;
$n_2$ is a refractive index of the second medium; and
$\xi$ is a freely selectable factor between 0.5 and 2.

4. The optical transmission system according to claim 3;
wherein factor $\xi$ is equal to 1 so that the optical transmission system is configured to image the selected region of the sample in an object-preserving manner.

5. A microscope for imaging a region of a sample arranged in a first medium in an object plane on or in a sample carrier which is formed at least partially as plane-parallel plate, comprising:
the optical transmission system according to claim 1; and
at least one microscope objective that is configured to image out of or into the intermediate image plane in the second medium;
wherein an optical axis of the at least one microscope objective is configured to extend perpendicular to the intermediate image plane; and
wherein the at least one microscope objective configured to focus on the intermediate image plane.

6. The microscope according to claim 5;
wherein a numerical aperture $NA_M$ of the at least one microscope objective is not higher than a numerical aperture $NA_O$ of the optical transmission system.

7. The microscope according to claim 5;
wherein a region between the at least one lens of the optical transmission system and the plane-parallel plate is filled with a third medium as immersion medium for the optical transmission system.

8. The microscope according to claim 7;
wherein the first medium and the third medium are immersion media; and
wherein the second medium is air.

9. The microscope according to claim 5, further comprising:
a holder configured to receive and fix the optical transmission system relative to a stand, a sample stage, the sample carrier, or a combination thereof.

10. The microscope according to claim 5;
wherein the at least one microscope objective is configured as a dry objective.

11. The microscope according to claim 5;
wherein an angle formed by the optical axis of the at least one microscope objective and the optical axis of the optical transmission system is configured to be freely adjustable.

12. The microscope according to claim 5;
wherein the optical axis of the at least one microscope objective forms an angle not equal to zero with the optical axis of the optical transmission system; and
wherein the at least one microscope objective is rotatable, with respect to the optical transmission system, around the optical axis of the optical transmission system.

13. The microscope according to claim 5;
wherein the microscope is configured as light sheet microscope;
wherein the at least one microscope objective comprises:
an illumination objective configured to illuminate the sample with a light sheet; and
a detection objective configured to detect light which is emitted from the region of the sample;
wherein optical axes of the illumination objective and detection objective form an angle, with respect to each other, not equal to zero.

14. The microscope according to claim 13;
wherein each of the optical axes of the illumination objective, of the optical transmission system, and of the detection objective lies in a plane.

15. The microscope according claim 13;
wherein the optical axis of the detection objective is fixed relative to the optical axis of the optical transmission system; and
wherein the illumination objective is rotatable, relative to the detection objective, around the optical axis of the detection objective.

16. The microscope according to claim 13, further comprising:
a third microscope objective;
wherein the optical axis of the illumination objective defines a first plane with the optical axis of the optical transmission system;
wherein the optical axis of the detection objective defines a second plane with the optical axis of the transmission system;
an optical axis of the third microscope objective defines a third plane with the optical axis of the optical transmission system;
wherein the second plane intersects the first plane at a predetermined angle; and
wherein the third plane intersects each of the first plane and second plane at a predetermined angle.

17. The microscope according to claim 13, further comprising:
an objective turret at which the illumination objective and the detection objective are arranged, and at which a further microscope objective is arranged;
wherein the microscope is configured to be operated, in a first position of the objective turret in which the illumination objective and the detection objective are swiveled into the beam path, in a first operating mode as light sheet microscope; and
wherein the microscope is configured to be operated, in a second position in which only the further microscope objective is swiveled into the beam path, in a second operating mode different from the first operating mode.

18. The microscope according to claim 17;
wherein an optical axis of the further microscope objective coincides with the optical axis of the optical transmission system when the further microscope objective is swiveled into the beam path.

19. The optical transmission system according to claim 2;
wherein at least one of the two rotationally symmetrical lenses is provided with an aspherically shaped surface.

20. The optical transmission system according to claim 3;
wherein a numerical aperture of the optical transmission system is set to provide an opening angle of at least 75°.

21. The microscope according to claim 16;
wherein the optical axes of the illumination objective, the detection objective, and the third microscope objective are perpendicular to one another in pairs.

22. The microscope according to claim 5, further comprising:
wherein the microscope is configured as light sheet microscope;
wherein the at least on microscope objective comprises:
a first microscope objective; and
a second microscope objective; and
a third microscope objective;
wherein the microscope further comprises:
a control configured to selectively operate the first microscope objective, the second microscope objective, and the third microscope objective as an illumination objective configured to illuminate the sample with a light sheet, or as a detection objective configured to detect light which is emitted from the region of the sample;
wherein optical axes of the illumination objective and detection objective form an angle, with respect to each other, not equal to zero;
wherein the optical axis of the illumination objective defines a first plane with the optical axis of the optical transmission system;
wherein the optical axis of the detection objective defines a second plane with the optical axis of the transmission system;
an optical axis of the third microscope objective defines a third plane with the optical axis of the optical transmission system;
wherein the second plane intersects the first plane at a predetermined angle; and
wherein the third plane intersects each of the first plane and second plane at a predetermined angle.

* * * * *